United States Patent
Okuley

(10) Patent No.: US 9,864,435 B2
(45) Date of Patent: Jan. 9, 2018

(54) TECHNIQUES FOR NOTEBOOK HINGE SENSORS

(71) Applicant: INTEL CORPORATION, Santa Clara, CA (US)

(72) Inventor: James M. Okuley, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/211,372

(22) Filed: Jul. 15, 2016

(65) Prior Publication Data

US 2017/0160809 A1    Jun. 8, 2017

Related U.S. Application Data

(63) Continuation of application No. 13/976,902, filed as application No. PCT/US2011/063149 on Dec. 2, 2011, now Pat. No. 9,395,820.

(51) Int. Cl.
| | |
|---|---|
| *G06F 3/033* | (2013.01) |
| *G06F 3/01* | (2006.01) |
| *G06F 1/16* | (2006.01) |
| *G06F 3/0481* | (2013.01) |

(52) U.S. Cl.
CPC ........... *G06F 3/017* (2013.01); *G06F 1/1616* (2013.01); *G06F 1/1681* (2013.01); *G06F 1/1684* (2013.01); *G06F 3/04812* (2013.01)

(58) Field of Classification Search
CPC ...... G06F 3/033; G06F 3/0304; G06F 3/0346; G06F 3/042; G06F 3/044; G06F 3/0428
See application file for complete search history.

(56) References Cited

U.S. PATENT DOCUMENTS

| | | | |
|---|---|---|---|
| 6,933,981 B1* | 8/2005 | Kishida | H04N 1/00249 348/207.1 |
| 9,395,820 B2* | 7/2016 | Okuley | G06F 1/1616 |
| 2005/0012720 A1* | 1/2005 | Pryor | G06F 3/017 345/168 |
| 2008/0112113 A1* | 5/2008 | Sawadski | H04M 1/0218 361/679.27 |
| 2011/0205155 A1* | 8/2011 | Newton | G06F 3/011 345/157 |

\* cited by examiner

*Primary Examiner* — Vijay Shankar

(57) ABSTRACT

Techniques are described for notebook hinge sensors. For example, a computing device may comprise a housing having a processor circuit and an input device, the input device arranged on a side of the housing, a lid having a digital display arranged on a side of the lid, a hinge arranged to couple the housing and the lid, and a sensor module coupled to the processor circuit, the sensor module arranged inside the hinge and operative to capture motion input outside of the computing device.

19 Claims, 10 Drawing Sheets

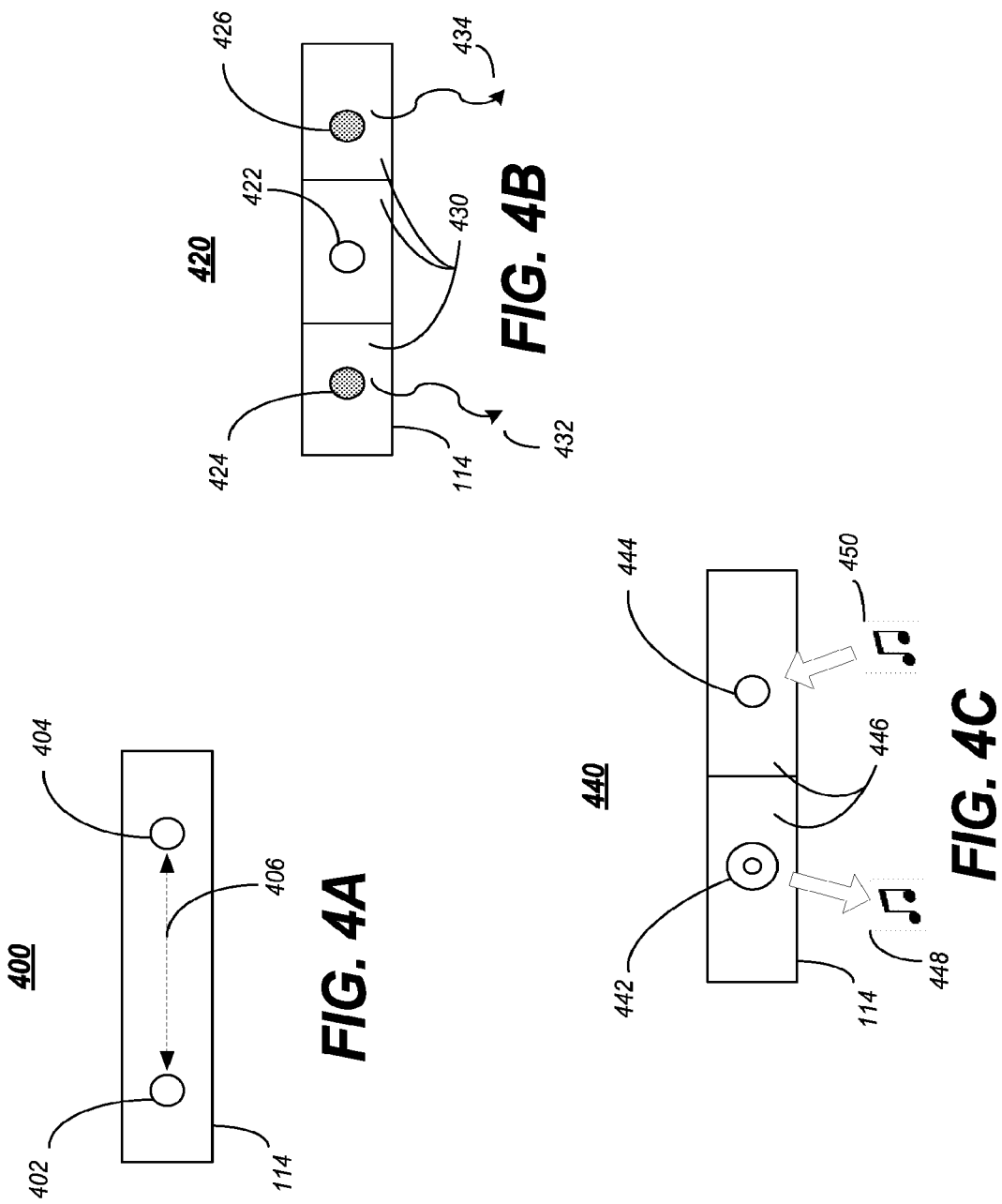

US 9,864,435 B2

TECHNIQUES FOR NOTEBOOK HINGE SENSORS

CROSS-REFERENCE TO RELATED APPLICATIONS

This application is a continuation of, claims the benefit of and priority to previously filed U.S. patent application Ser. No. 13/976,902 filed Jun. 24, 2014, which is a U.S. National Stage entry of PCT/US2011/063149; both of which are incorporated herein by reference in their entirety.

BACKGROUND

Modern computing systems continue to evolve in size, shape and functionality. In particular, computing devices continue to decrease in size while functionality continues to increase. For example, designing computing systems with a thin or ultra-thin platform design is becoming an increasing important consideration, while these same systems are expected to function in any number of different configurations. Furthermore, in addition to thin designs, modern computing system designs are also expected to be functional and aesthetically appealing. As the need for increased functionality continues to increase, the need for additional sensors in a computing device also continue to increase. However, these sensors occupy valuable space in the platform design and, in the past, have limited the design of computing systems and the inclusion and placement of the sensors. Consequently, a need exists for techniques for notebook hinge sensors.

BRIEF DESCRIPTION OF THE DRAWINGS

FIG. 4A illustrates one embodiment of a seventh apparatus.
FIG. 4B illustrates one embodiment of an eighth apparatus.
FIG. 4C illustrates one embodiment of a ninth apparatus.

DETAILED DESCRIPTION

Some embodiments are generally directed to techniques for a hinge-based sensor for a notebook computer. Various embodiments provide techniques that include a computing device comprising a housing having a processor circuit and an input device, a lid having a digital display and a hinge arranged to couple the housing and the lid. In some embodiments, a sensor module may be coupled to the processor circuit and may be arranged inside the hinge. In various embodiments, the sensor module may be operative to capture motion input outside of the computing device. Other embodiments are described and claimed.

Many systems that are intended to be thin or ultra thin in their design are limited by the number and type of components that may occupy a major portion of the available space in a housing or enclosure of the system. This may be especially true for compact systems arranged in a notebook or netbook configuration. This may be due in part to the fact that the lid of these systems may be very thin and my not provide adequate space for certain components.

Despite a form factor that continues to decrease in size, many systems continue to include increased functionality. One particular area that has continued to evolve is the inclusion of one or more sensors configured to provide enhanced computing capabilities and to improve the user experience. These sensors, however, require space that is not available in many systems. Consequently, to address these and other problems, hinge-based sensor techniques are described herein.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
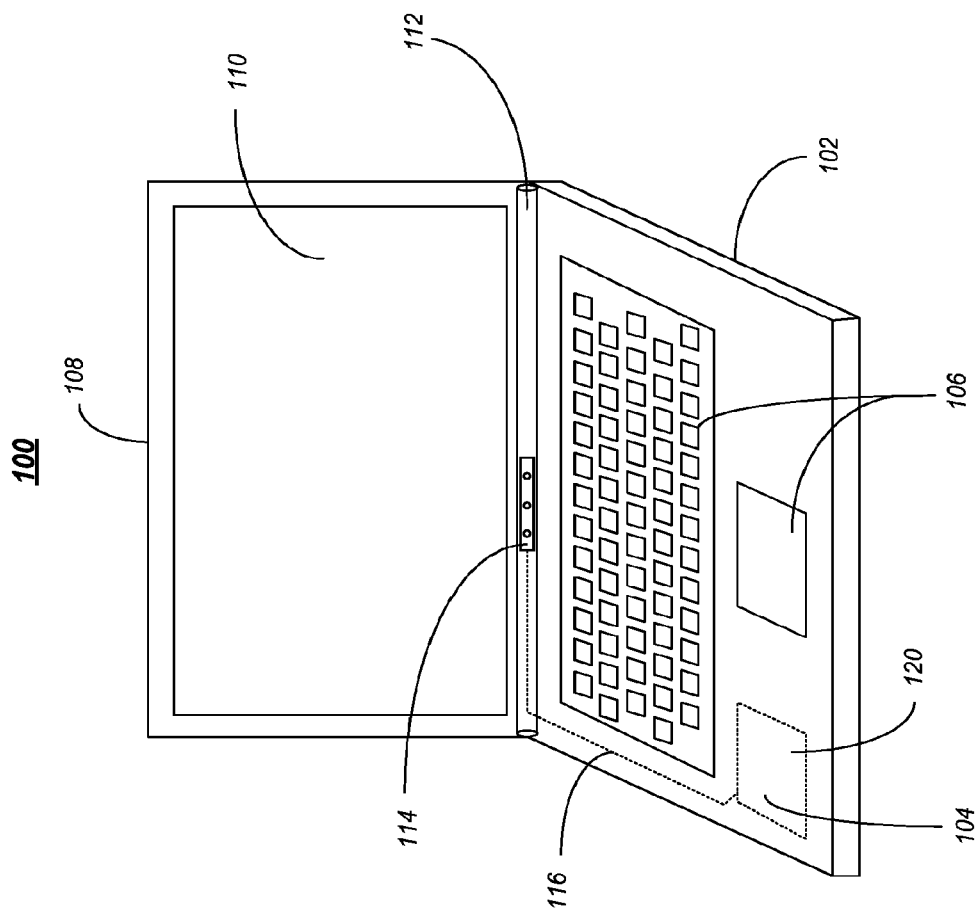
FIG. 1 illustrates one embodiment of a first apparatus.

FIG. 1 illustrates one embodiment of an apparatus 100. Apparatus 100 may comprise a computing device in some embodiments. In various embodiments, computing device 100 may comprise a laptop, clamshell, notebook or netbook computer. While described herein as a computing device 100 or notebook computer 100, it should be understood that any suitable computing system including components the same or similar to those shown in FIG. 1 could be used and still fall within the described embodiments. The embodiments are not limited in this context.

In various embodiments, computing device 100 may include a housing 102, processor circuit 104, input device(s) 106, lid 108, display 110, hinge 112 and sensor module 114. While a limited number and arrangement of components are shown in FIG. 1 for purposes of illustration, it should be understood that computing device 100 may include any number or arrangement of components and still fall within the described embodiments. For example, computing device 100 may additionally include, in some embodiments, memory containing instructions to be executed by one or more multi-core processors for example. The embodiments, however, are not limited to the elements or the configuration shown in this figure. Additional components for computing device 100 are discussed in further detail below with reference to FIG. 7.

Housing 102 may comprise an enclosure, case or other device suitable to support, surround, protect or enclose one or more computing components for computing device 100. For example, housing 102 may comprise a rigid plastic or metal body that surrounds or supports one or more computing components for computing device 100. In various embodiments, housing 102 may comprise the base or body of notebook computer 100 and may additional include, support or comprise memory, one or more wireless transceivers, a battery, one or more input devices 106 and a processor circuit 104. Other embodiments are described and claimed.

In some embodiments, processor circuit 104 may comprise a processor, system-on-chip, or other device having one or more processor cores. Processor circuit 104 may comprise a central processing unit comprising one or more processor cores in some embodiments. The processor circuit 104 may include any type of processing unit, such as, for example, CPU, multi-processing unit, a reduced instruction set computer (RISC), a processor that have a pipeline, a complex instruction set computer (CISC), digital signal processor (DSP), and so forth.

Input device(s) 106 may comprise any suitable device used to provide or receive data and/or control signals for computing device 100. For example, as shown in FIG. 1, input devices 106 may comprise a keyboard and a trackpad or other pointing device. In some embodiments, input devices 106 may provide an interface that allows a user to interact with computing system 100. In various embodiments, the input device(s) are arranged on a side of housing 102 as shown in FIG. 1. The embodiments, however, are not limited to the number, type or arrangement of input devices shown in FIG. 1.

Computing device 100 may include lid 108 in some embodiments. Lid 108 may comprise a supporting structure or enclosure for display 110 in some embodiments. For example, lid 108 may comprise a rigid plastic or metal enclosure in the same or similar form to housing 102. While not shown in FIG. 1, it should be understood that lid 108 may support additional components other than display 110. For example, in some embodiments lid 108 may additional include or support one or more cameras (e.g. web cams) in a bezel area of the lid 108 above display 110. In other embodiments lid 108 may also include one or more antennas for computing device 100. Other embodiments are described and claimed.

In some embodiments, display 110 may comprise any suitable visual interface for displaying content to a user of the computing device 100. In one embodiment, for example, the display 110 may be implemented by a liquid crystal display (LCD), plasma display, light emitting diode (LED) display or a touch-sensitive color LCD screen. The touch-sensitive LCD may be used with a stylus and/or a handwriting recognizer program in some embodiments. In various embodiments, the digital display 110 is supported and/or protected by lid 108 that is arranged to around the digital display 110 and is coupled to housing 102 using hinge 112.

Hinge 112 may comprise any suitable connection means for attaching lid 108 and housing 102. For example, hinge 112 may comprise or include a bearing arranged to couple or connects housing 102 and lid 108. In some embodiments, hinge 112 may allow limited angle of rotation between housing 102 and lid 108. In various embodiments like 108 may be arranged to rotate relative to housing 102 about a fixed axis of rotation. Hinge 112 may be made of flexible material or of moving components. In various embodiments, hinge 112 may comprise multiple hinges that work together as a hinge system to couple housing 102 and lid 108. Hinge 112 may comprise one or more of a barrel hinge, drop-down hinge, pivot hinge, butterfly hinge, piano hinge or any other suitable hinge as would be understood by one skilled in the art. The embodiments are not limited in this context.

In various embodiments, computing device 100 may include sensor module 114. Sensor module 114 may be coupled to processor circuit 104 in some embodiments. In various embodiments, sensor module 114 may be arranged inside hinge 112 and may be operative to capture motion input outside of computing device 100. For example, sensor module 114 may comprise one or more of an optical detection module or an acoustic detection module arranged to capture or detect one or more inputs, such as motion input or acoustic input. In some embodiments, sensor module 114 may comprise one or more devices arranged to measure a physical quantity and convert it into a signal that can be interpreted by processor circuit 104.

Figure 2A:
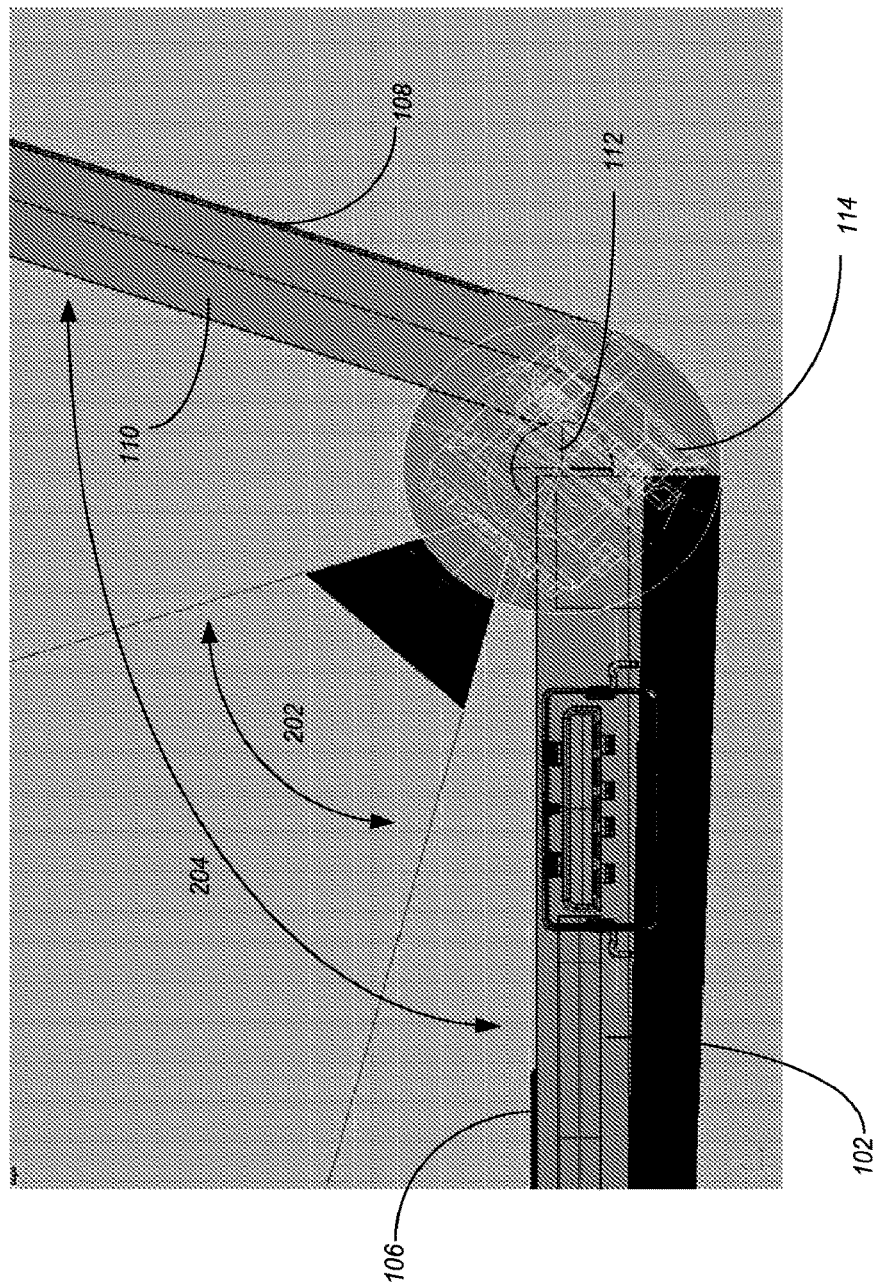
FIG. 2A illustrates one embodiment of a second apparatus.

FIG. 2A illustrates one embodiment of an apparatus 200. Apparatus 200 may comprise a computing device in some embodiments and may be the same or similar to computing device 100 of FIG. 1. In various embodiments, computing device 200 may include a barrel hinge 112. A barrel hinge may comprise a sectional barrel secured by a pivot in some embodiments. For example, a barrel may comprise a component of a hinge that has a hollow cylinder shaped section where the rotational bearing force is applied to the pivot, and may also have a screw shaped section for fastening and/or driving the pivot. In various embodiments, as shown in FIG. 2A, the sensor module 114 may be arranged inside a cylindrical chamber defined by the barrel hinge 112. It should be understood that the sensor module 114 in FIG. 2A comprises an expanded view of the module and that in some embodiments the sensor module 114 fits entirely inside barrel hinge 112.

In some embodiments, the lid 108 and the housing 102 may be separated by an angle 204. In various embodiments, the lid 108 may be arranged to rotate around a fixed point at hinge 112 which may allow the lid 108 to rotate up and away from housing 102 or down and toward housing 102. In various embodiments, the angle 204 may change based on the movement of the lid 108, such as by a user adjusting the lid 108 for comfortable operation.

In various embodiments, the sensor module 114 may have a field of view defined by the angle 204 of the lid 108 with respect to the housing 102. For example, the sensor module 114 may be arranged inside 112 such that the sensor module 114 and/or hinge 112 rotate in combination with change in the angle 204. In some embodiments, as the angle 204 is changed to allow for a proper viewing angle by a user, the field of view for the sensor module 114 may also be changed such that the display 110 and sensor module 114 may have the same or a similar point of focus. The embodiments are not limited in this context.

The motion input captured by the sensor module 114 may occur in an area defined by an angle 202 between the housing 102 and the lid 108 when the lid 108 is rotated away from the housing 102. For example, when the lid 108 is open in an operating position as shown in FIG. 2A, the sensor module 114 may be arranged to have a field of view 202 defined by an angle that is less than the angle 204 between the lid 108 and the housing 102. In other embodiments, the field of view 202 may be larger or smaller than that shown in FIG. 2A and the embodiments are not limited in this respect. One skilled in the art will understand that the field of view of sensor module 114 may be changed based on various selection criteria including but not limited to the type or arrangement of the sensor module 114, the size of the opening in the hinge 112 or any other relevant parameter.

Figure 2B:
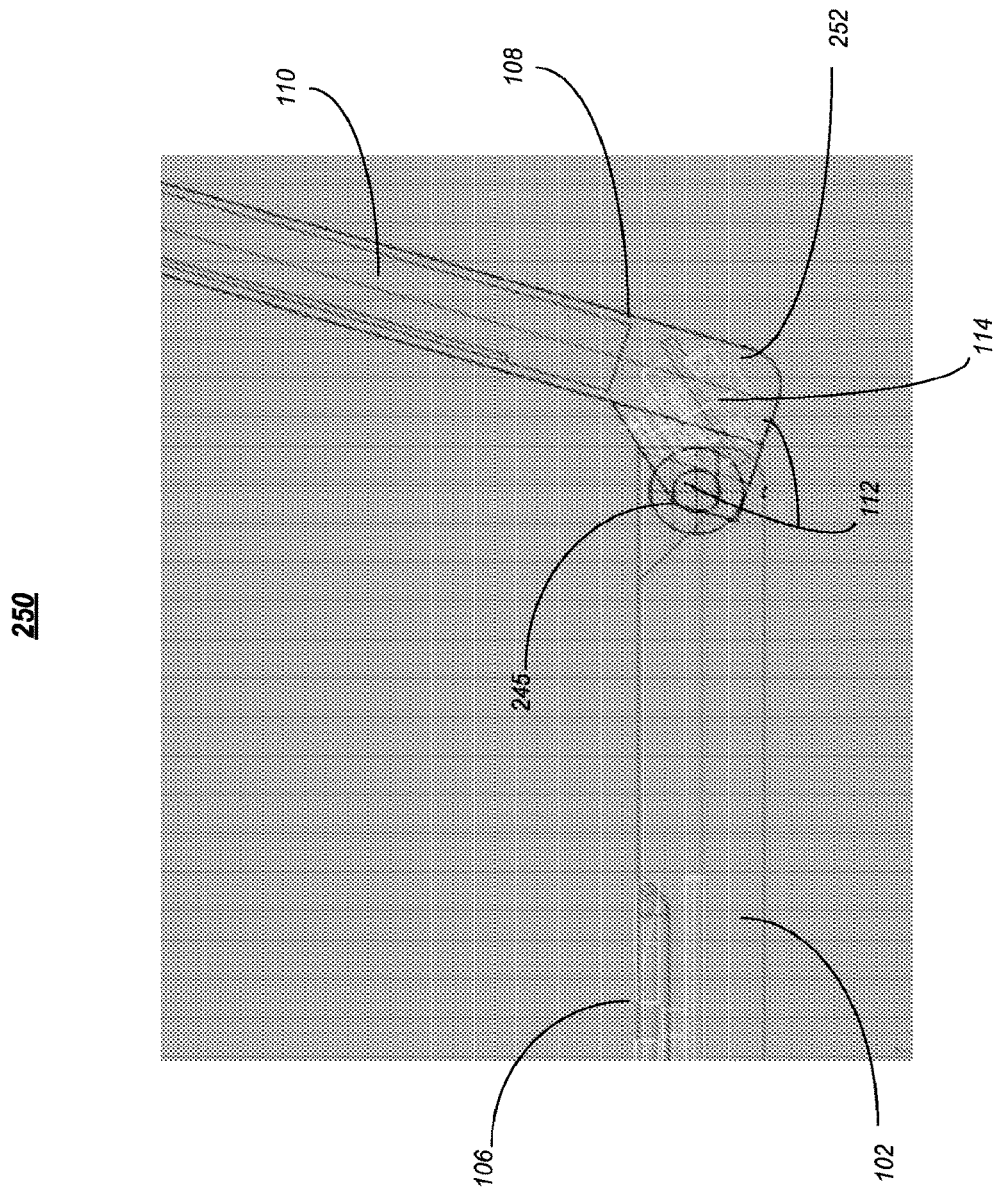
FIG. 2B illustrates one embodiment of a third apparatus.

FIG. 2B illustrates one embodiment of an apparatus 250. Apparatus 250 may comprise a computing device in some embodiments and may be the same or similar to computing device 100 of FIG. 1 or computing device 200 of FIG. 2A. In various embodiments, computing device 250 may include a drop down hinge 212 having a first portion 252 and a second portion 245. In some embodiments, the first portion 252 may extended from or be formed, stamped, molded or otherwise arranged as part of the lid 108 and the second portion 245 may extend from or be formed, stamped, molded or otherwise arranged as part of the housing 102.

As shown in FIG. 2B, this drop-down hinge 112 arrangement may create a cavity at the base of lid 108 below display 110. In various embodiments, the sensor module 114 may be arranged inside the first portion 252 below in the lid 108 portion of the drop-down hinge 112 below the digital display 110. In some embodiments, the first portion 252 may create an angle with respect to the lid 108 and display 110 that may assist with the proper positioning and/or aiming of the sensor module 114 when the display 110 and lid 108 are in the operating position. While a limited number, type and arrangement of hinges are described herein for purposes of clarity, it should be understood that any type of hinge could be used in the described embodiments. As such, other embodiments are described and claimed.

Figure 3A:
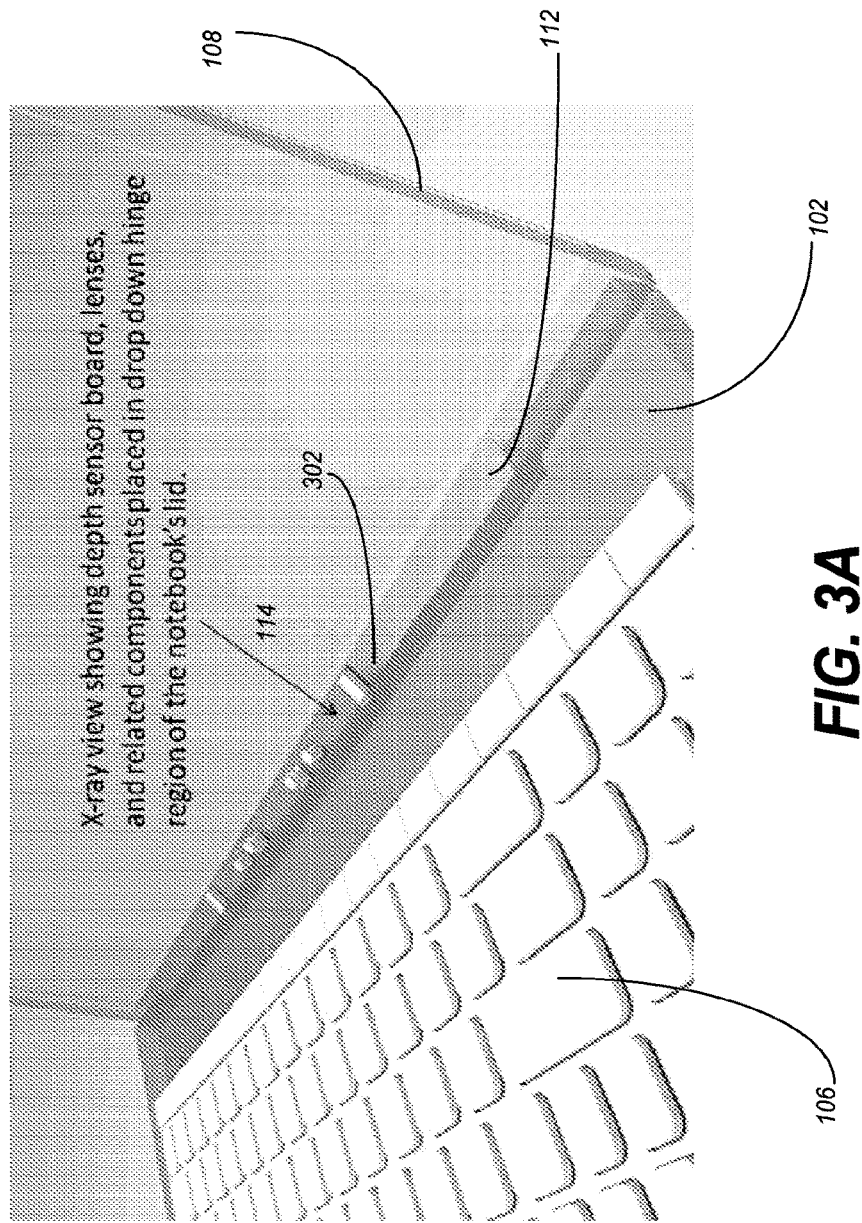
FIG. 3A illustrates one embodiments of a fourth apparatus

FIG. 3A illustrates one embodiment of an apparatus 300. Apparatus 300 may comprise a computing device in some embodiments and may be the same or similar to computing device 100 of FIG. 1, computing device 200 of FIG. 2A or computing device 250 of FIG. 2B. In various embodiments, computing device 300 may include an opening 302 in the hinge 112 to accommodate the sensor 114. In various embodiments, the opening 302 may be arranged to provide a field of view for the sensor module 114 to capture the motion input.

In some embodiments, the opening 302 may be arranged to allow one or more lenses, lights, cameras or other components of sensor module 114 to be exposed through the hinge 112 and any casing or covering that forms part of lid 108 or housing 102. In various embodiments, opening 302 may expose the entire sensor module 114. The embodiments are not limited in this context.

Figure 3B:
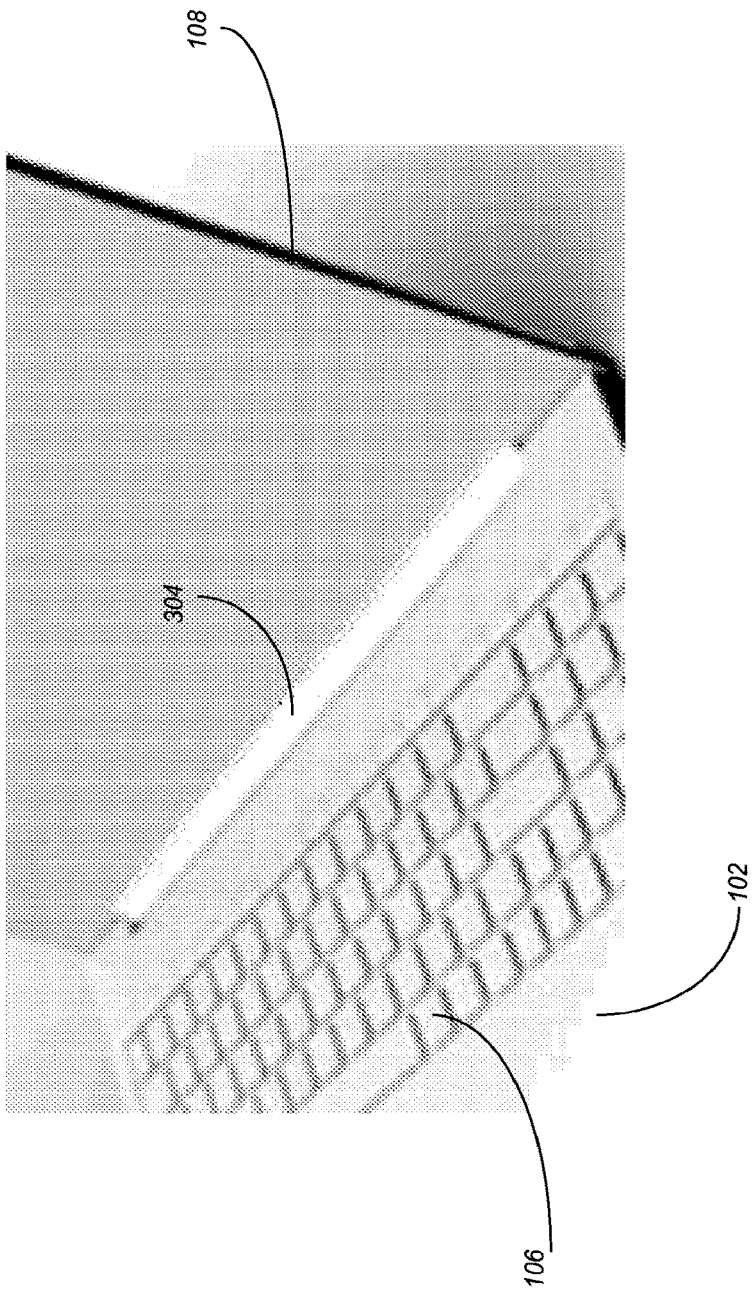
FIG. 3B illustrates one embodiment of a fifth apparatus.

FIG. 3B illustrates one embodiment of an apparatus 320. Apparatus 320 may comprise a computing device in some embodiments and may be the same or similar to computing device 100 of FIG. 1, computing device 200 of FIG. 2A, computing device 250 of FIG. 2B or computing device 300 of FIG. 3A. In various embodiments, computing device 320 may include a window 304 arranged to cover the opening 302. For example, the window may comprise a material selected to substantially conceal the sensor module 114 and to allow the sensor module 114 to function through the window 304. In the embodiment shown in FIG. 3B, the window 304 is arranged on the first portion 252 of the drop-down hinge 212.

In various embodiments, the window 304 may comprise a transparent or translucent material. For example, the window 304 may comprise IR plastic, glass or any other suitable material. In some embodiments, the window 304 may be clear, colored, tinted or otherwise manipulated to change the aesthetic appearance of computing device 320. The embodiments are not limited in this respect.

Figure 3C:
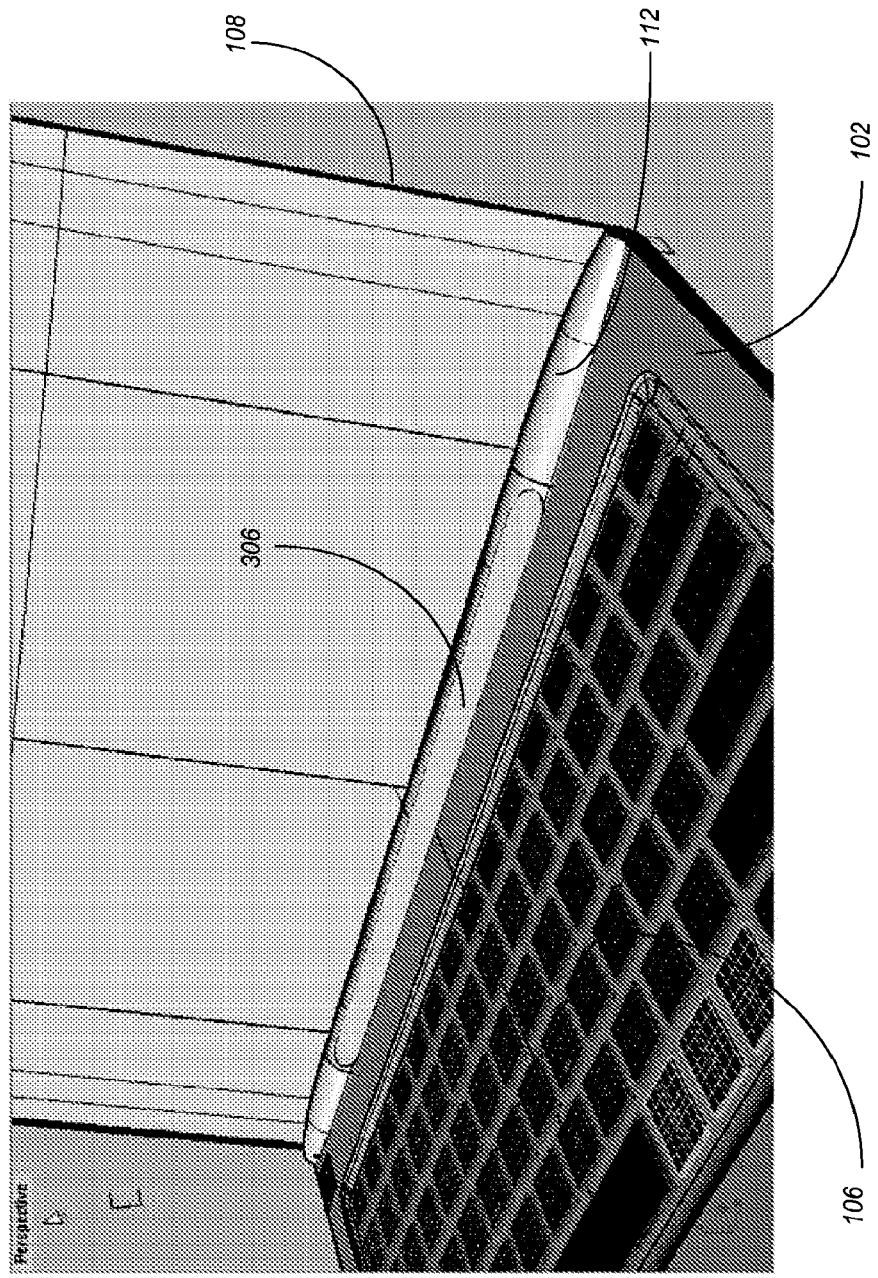
FIG. 3C illustrates one embodiment of a sixth apparatus.

FIG. 3C illustrates one embodiment of an apparatus 350. Apparatus 350 may comprise a computing device in some embodiments and may be the same or similar to computing device 100 of FIG. 1, computing device 200 of FIG. 2A, computing device 250 of FIG. 2B, computing device 300 of FIG. 3A or computing device 320 of FIG. 3B. In various embodiments, computing device 350 may include a barrel hinge 212 and a cover 306 arranged to cover the sensor module 114. As shown in FIG. 3C, in the barrel hinge 112 configuration, the window 306 may be arranged in or as part of a cylindrical hinge cover. In some embodiments, the window 306 may be arranged to match a radius of the barrel hinge 112 or the barrel hinge cover. Other embodiments are described and claimed.

In various embodiments, the sensor module 114 of computing devices of FIG. 1, FIG. 2A, FIG. 2B, FIG. 3A, FIG. 3B or FIG. 3C may be arranged to detect or capture motion input outside of the computing device. For example, sensor module 114 along with processor circuit 104 may be arranged to monitor track or confirm a change in position of an object relative to its surroundings or the change in the surroundings relative to an object. In various embodiments the motion can be detected by sound (e.g. using acoustic sensors), opacity (e.g. using optical and infrared sensors and video image processors), geomagnetism (e.g. using magnetic sensors, magnetometers), reflection of transmitted energy (e.g. using infrared laser radar, ultrasonic sensors, and microwave radar sensors), electromagnetic induction (e.g. using inductive-loop detectors), and vibration (e.g. triboelectric, seismic, and inertia-switch sensors).

In some embodiments, infrared (IR) light or laser technology may be used for optical detection. For example, sensor module 114 may include a sensor that detects a disturbance in the infrared spectrum, such as a person. In various embodiments, a simple algorithm for motion detection may be implemented or utilized by processor circuit 104 to compare a current image with a reference image and simply counts the number of different pixels. Since images will naturally differ due to factors such as varying lighting, camera flicker, and CCD dark currents, pre-processing may be useful to reduce the number of false positives detected by the system. In other embodiments, more complex algorithms may be used.

FIG. 4A illustrates one embodiment of an apparatus 400. Apparatus 400 may comprise one embodiments of a sensor module in some embodiments that may be the same or similar to sensor module 114 of FIG. 1, FIG. 2A, FIG. 2B, FIG. 3A, FIG. 3B or FIG. 3C. In various embodiments, apparatus 400 may comprise a sensor module comprising a stereo camera having two or more lenses 402, 404 arranged to capture three-dimensional (3D) motion input.

In various embodiments, stereo camera 400 may comprise one or more cameras having two or more lenses with a separate image sensor for each lens. In some embodiments this may allow the camera 400 to simulate human binocular vision, and therefore provide the ability to capture three-dimensional images, a process known as stereo photography. In some embodiments, the distance between the lenses 406 (e.g. the intra-axial distance) may be selected to be approximately the same as an average distance between an adult human's eyes (e.g. intra-ocular distance) that may comprise approximately 6.35 cm. In various embodiments, however, a greater inter-camera distance 406 may produce more extreme 3-dimensionality. While only two cameras or lenses 402, 404 are shown in FIG. 4A, it should be understood than any number, type or arrangement of camera could be used and still fall within the described embodiments.

FIG. 4B illustrates one embodiment of an apparatus 420. Apparatus 420 may comprise one embodiments of a sensor module in some embodiments that may be the same or similar to sensor module 114 of FIG. 1, FIG. 2A, FIG. 2B, FIG. 3A, FIG. 3B or FIG. 3C. In various embodiments, sensor module 420 may comprise one or more infrared (IR) lights 424, 426 and an IR camera 422 arranged to capture three-dimensional (3D) motion input. The IR lights 424, 426 my be arranged to generate or produce an IR light in some embodiments and the IR camera 422 may be arranged to detected changes in occurring in the IR light to detect motion.

In some embodiments, the IR camera 422 and IR lights 424, 426 may be arranged in separate compartments 430 inside the hinge 112. For example, the IR lights 424, 426 and the IR camera 422 may be separated to prevent IR light for leaking into the view of the IR camera 422 inside the hinge 112. In some embodiments, dividers may be present in the hinge 112 to separate the IR lights 424, 426 and the IR camera 422 to create the separate chambers or compartments 430. In various embodiments, the IR lights 424, 426 and the IR camera 422 may be covered with different windows 304, 306 or different window 304, 306 materials. Other embodiments are described and claimed.

FIG. 4C illustrates one embodiment of an apparatus 440. Apparatus 440 may comprise one embodiments of a sensor module in some embodiments that may be the same or similar to sensor module 114 of FIG. 1, FIG. 2A, FIG. 2B, FIG. 3A, FIG. 3B or FIG. 3C. In various embodiments, sensor module 440 may comprise or include one or more speakers 442 and one or more microphones 444 arranged to perform acoustic motion detection. The speaker 442 and microphone 444 may be arranged in separate compartments 446 in hinge 112 to prevent acoustic leakage of the sound 448 produced by speaker 442 and the sound 450 received by microphone 444. While a limited number, type and arrangement of sensor modules are described for purposes of clarity, it should be understood that any suitable sensor module 114 could be used and still fall within the described embodiments.

Figure 5:
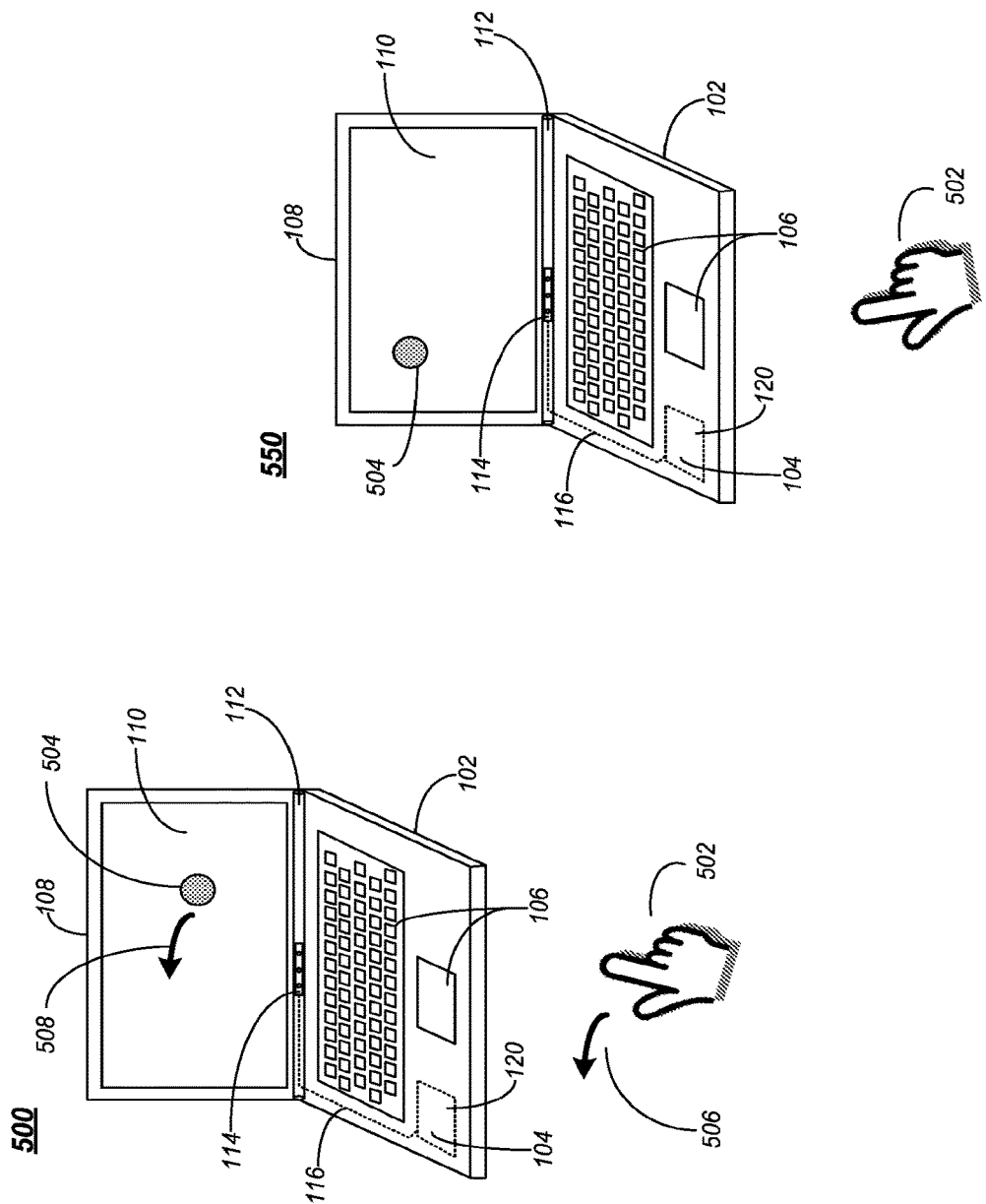
FIG. 5 illustrates one embodiment of a tenth apparatus.

FIG. 5 illustrates one embodiment of an apparatus 500. Apparatus 500 may comprise a computing device in some embodiments and may be the same or similar to computing device 100 of FIG. 1, computing device 200 of FIG. 2A, computing device 250 of FIG. 2B, computing device 300 of FIG. 3A, computing device 320 of FIG. 3B or computing device 350 of FIG. 3C. In various embodiments, computing device 350 may include a sensor module 114 that may be the same or similar to one or more of sensor modules 400, 420 or 440 of FIG. 4A, 4B or 4C respectively. In some embodiments, computing device 500 may illustrate one example of gesture control utilizing sensor module 114.

In various embodiments, the processor circuit 104 may be arranged to analyze the captured motion input and to manipulate one or more graphical user interface elements 504 displayed on the display 110 in response to the motion input 506. For example, the motion input 506 may comprise one or more gestures by a user 502 of the computing device or eye movement of the user. In various embodiments, any suitable algorithm or program may be used or implemented by processor circuit 104 as one skilled in the art would readily understand.

As shown in FIG. 5, sensor module 114 may be arranged to detect the movement 506 of a user's hand 502 and may adjust 508 one or more graphical interface elements 504 based on the detected motion. In the embodiments shown in FIG. 5, a graphical user interface element 504 such as a cursor or other pointer may be moved to coincide with the direction or area where the user 502 is pointing. Other embodiments are described and claimed.

In some embodiments, the computing devices described herein may implement any known gesture control or gesture tracking activities or applications. For example, sensor module 114 may be arranged to capture and processor circuit 104 may be arranged to interpret human gestures via mathematical algorithms. In various embodiments, gestures can originate from any bodily motion or state but commonly originate from the face or hand. In some embodiments, the gesture recognition performed by the computing devices described herein may provide richer bridge between machines and humans than primitive text user interfaces or even GUIs (graphical user interfaces), which still limit the majority of input to a keyboard and mouse.

Gesture recognition as described herein may enable humans to interface with a computing device and interact naturally without any mechanical devices in some embodiments. For example, using the concept of gesture recognition, it may possible to point a finger at the computer screen so that the cursor will move accordingly as shown in FIG. 5.

In various embodiments, the gesture recognition performed by the computing devices described herein may be arranged to understand and interrupt one or more multitouch gestures. For example, a one-finger swipe in the air may be used to move one object between two points or dragging objects such as windows around on display 110 or a simple tap in the air may be used to select an object, usually a button. Using two fingers in the air, a user may be able to perform a pinch (e.g. pinching together the thumb and finger) to zoom out on an image or a reverse pinch to enlarge an image. In some embodiments, two-finger scrolling in the air may allow a user to scroll around a window similar to the scroll bars on the side and bottom. While a limited number and type of gestures are described herein, it should be understood that any suitable gesture could be used and still fall within the described embodiments.

Eye-gaze tracking may be implemented by sensor module 114 in some embodiments. For example, eye-gaze tracking or eye tracking may comprise a process of measuring either the point of gaze ("where we are looking") or the motion of an eye relative to the head. In various embodiments, sensor module 114 may be arranged to measure eye positions and eye movement for a user which may allow for points of interest on a display to be highlighted or objects to be moved based simply on the gaze of the user. Other embodiments are described and claimed.

In various embodiments, any of the sensor modules 114 described herein may be combined to form a motion tracking system. For example, a RGB camera, depth sensor and multi-array microphone may be arranged to provide full-body 3D motion capture, facial recognition and voice recognition capabilities in some embodiments. In some embodiments, the sensor module 1145 may be arranged to perform acoustic source localization and ambient noise suppression.

In some embodiments, a depth sensor of sensor module 114 may consist of an infrared laser projector combined with a monochrome CMOS sensor, which captures video data in 3D under any ambient light conditions where the sensing range of the depth sensor may be adjustable. In various embodiments, the software, algorithms or applications implemented by processing circuit 104 may be capable of automatically calibrating the sensor based on a physical environment, accommodating for the presence of furniture or other obstacles. Other embodiments are described and claimed.

The above-described embodiments may be used to improve system design, functionality, ergonomics and aesthetics in computing devices while maximizing the computing functionality and components that can be included in a compact, thin or ultra thin computing device. In various embodiments, the above-described techniques and embodiments may be applicable any type of computing device including a hinge, such a laptop, notebook or netbook computer. In these and other embodiments, including the above-described computing devices, incorporation of a sensor module as described may decrease the overall system height and add much needed advanced computing functionality to system that would otherwise be limited by space and size constraints. As such, substantial improvements in computing system design can be achieved through the above-described embodiments.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 6:
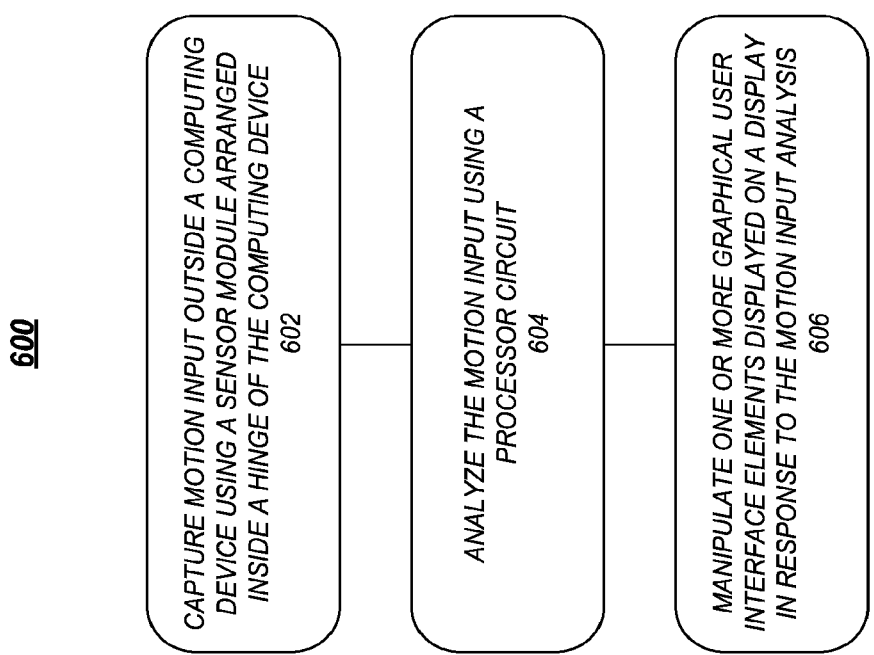
FIG. 6 illustrations one embodiment of a logic diagram.

FIG. 6 illustrates one embodiment of a logic flow 600. The logic flow 600 may be performed by various systems and/or devices and may be implemented as hardware, software, firmware, and/or any combination thereof, as desired for a given set of design parameters or performance constraints. For example, one or more operations of the logic flow 300 may be implemented by executable programming or non-transitory computer-readable instructions to be executed by a logic device (e.g., computer, processor). Logic flow 600 may describe the operation, assembly, manufacture, design or arrangement of the embodiments described above with reference to FIGS. 1, 2A, 2B, 3A-C, 4A-C and 5. Other embodiments are described and claimed.

In various embodiments, motion input occurring outside a computing device is captured using a sensor module arranged inside a hinge of the computing device at 602. For example, sensor module 114 may be arranged to capture motion, gestures or other input occurring outside of computing device 100 (e.g. motion by a user or eye movement of a user). In some embodiments, the motion input may be analyzed using a processor circuit at 604. For example, processor circuit 104 may be coupled to sensor module 114 and may be arranged to interrupt the motion input captured by the sensor module 114. In various embodiments, one or more graphical user interface elements displayed on a display may be manipulated in response to the motion input analysis at 606. For example, as shown in FIG. 5, GUI element 504 may be moved 508 based on the motion input 502, 506.

In various embodiments, a sensor module may be arranged to rotate in a coordinated manner with a display of the computing device. For example, sensor module 114 may be arranged to rotate in connection with one or more of hinge 112 or lid 108. In this manner, sensor module 114 may be aimed or positioned to capture motion input when display 110 is in a suitable operating position. In some embodiments, the sensor module may be calibrated based on an angle of a display of the computing device. For example, a field of view 202 for sensor module 114 may be determined based on angle 204 between lid 108 and housing 102 and appropriate calibrations may be performed. Other embodiments are described and claimed.

Figure 7:
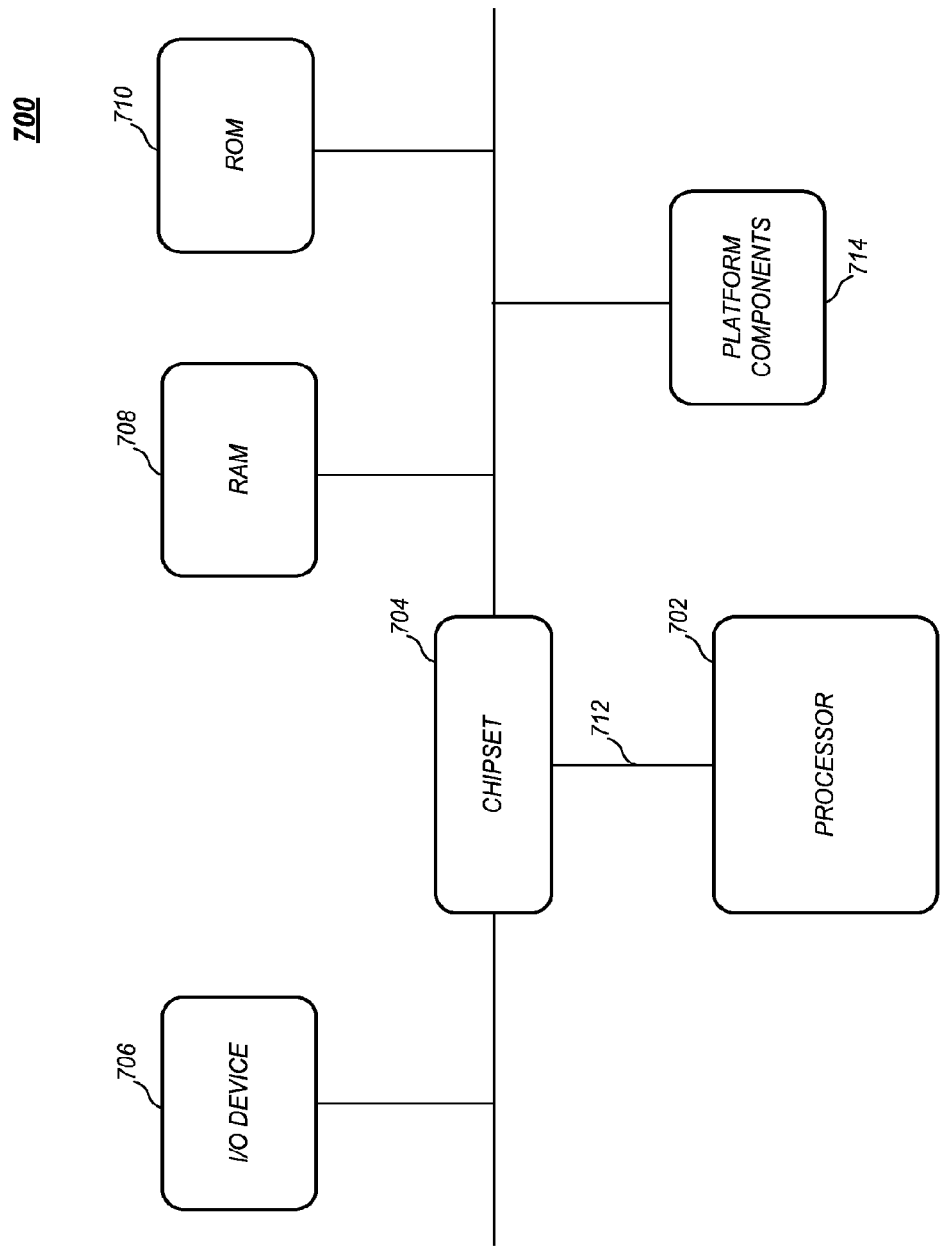
FIG. 7 illustrates one embodiment of a system.

FIG. 7 is a diagram of an exemplary system embodiment. In particular, FIG. 7 is a diagram showing a system 700, which may include various elements. For instance, FIG. 7 shows that system 700 may include a processor 702, a chipset 704, an input/output (I/O) device 706, a random access memory (RAM) (such as dynamic RAM (DRAM)) 708, and a read only memory (ROM) 710, and various platform components 714 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

In particular, the platform components 714 may include a cooling system implementing various thermal management techniques. The cooling system may be sized for the system 700, and may include any cooling elements designed to perform heat dissipation, such as heat pipes, heat links, heat transfers, heat spreaders, vents, fans, blowers, crossflow blowers and liquid-based coolants.

As shown in FIG. 7, I/O device 706, RAM 708, and ROM 710 are coupled to processor 702 by way of chipset 704. Chipset 704 may be coupled to processor 702 by a bus 712. Accordingly, bus 712 may include multiple lines.

Processor 702 may be a central processing unit comprising one or more processor cores and may include any number of processors having any number of processor cores. The processor 702 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 700 may include various interface circuits, such as an Ethernet interface and/or a Universal Serial Bus (USB) interface, and/or the like. In some exemplary embodiments, the I/O device 706 may comprise one or more input devices connected to interface circuits for entering data and commands into the system 700. For example, the input devices may include a keyboard, mouse, touch screen, track pad, track ball, isopoint, a voice recognition system, and/or the like. Similarly, the I/O device 706 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 700 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device, comprising:
   a hinge arranged to couple a housing and a lid of the computing device; and
   a sensor module arranged inside at least a portion of the hinge and operative to capture motion input occurring outside of the computing device, the hinge comprising an opening to accommodate the sensor module, the opening arranged to provide a field of view for the sensor module to capture the motion input.

2. The computing device of claim 1, the sensor module comprising one or more of an optical detection module or an acoustic detection module.

3. The computing device of claim 1, the sensor module having a field of view defined by an angle of the lid with respect to the housing.

4. The computing device of claim 1, the motion input to be captured by the sensor module in an area defined by an angle between the housing and the lid when the lid is rotated away from the housing.

5. The computing device of claim 1, the opening covered by a window comprising a material selected to substantially conceal the sensor module and to allow the sensor module to function through the window.

6. The computing device of claim 1, comprising a processor circuit arranged to analyze the motion input and to manipulate one or more graphical user interface in response to the motion input, the motion input comprising one or more gestures by a user of the computing device or eye movement of the user.

7. The computing device of claim 1, the hinge comprising a barrel hinge and the sensor module arranged inside a cylindrical chamber defined by the barrel hinge.

8. The computing device of claim 1, the hinge having a first portion extending from the lid and a second portion extending from the housing, the sensor module arranged inside the first portion.

9. The computing device of claim 1, the sensor module comprising a stereo camera having two or more lenses arranged to capture three-dimensional (3D) motion input.

10. The computing device of claim 1, the sensor module comprising one or more infrared (IR) lights and an IR camera arranged to capture three-dimensional (3D) motion input.

11. The computing device of claim 10, the IR camera and IR lights arranged in separate compartments inside the hinge.

12. The computing device of claim 1, the sensor module comprising one or more speakers and one or more microphones arranged to acoustically capture three-dimensional (3D) motion input.

13. A computer-implemented method, comprising:
capturing motion input occurring outside a computing device using a sensor module arranged inside at least a portion of a hinge of the computing device, the hinge comprising an opening to accommodate the sensor module, the opening arranged to provide a field of view for the sensor module to capture the motion input;
analyzing the motion input using a processor circuit; and
manipulating one or more graphical user interface elements in response to the motion input analysis.

14. The computer-implemented method of claim 13, the motion input comprising one or more gestures by a user of the computing device or eye movement of the user.

15. The computer-implemented method of claim 13, comprising:
rotating the sensor module in a coordinated manner with a display of the computing device.

16. The computer-implemented method of claim 13, comprising:
calibrating the sensor module based on an angle of the display of the computing device.

17. The computer-implemented method of claim 13, the hinge comprising a barrel hinge and the sensor module arranged inside a cylindrical chamber defined by the barrel hinge.

18. The computer-implemented method of claim 13, the hinge having a first portion extending from a lid of the computing device and a second portion extending from a housing of the computing device, the sensor module arranged inside the first portion below a digital display arranged in the lid of the computing device.

19. The computer-implemented method of claim 13, the sensor module comprising one or more of an optical detection module or an acoustic detection module.

* * * * *